United States Patent [19]

Pugaczewski et al.

[11] Patent Number: 5,450,488
[45] Date of Patent: Sep. 12, 1995

[54] MULTIPLE SERVICE VOICE MESSAGING SYSTEM

[76] Inventors: John B. Pugaczewski, 5210 Division St., White Bear Lake, Minn. 552110; Mark S. Maize, 4600 E. 109th Ave., Thornton, Colo. 80233

[21] Appl. No.: 204,793

[22] Filed: Mar. 2, 1994

Related U.S. Application Data

[63] Continuation of Ser. No. 989,725, Dec. 11, 1992, abandoned, which is a continuation of Ser. No. 599,693, Oct. 18, 1990, abandoned.

[51] Int. Cl.$^6$ .............................................. H04M 3/50
[52] U.S. Cl. ......................................... 379/67; 379/89; 379/211; 379/233
[58] Field of Search ..................... 379/89, 201, 88, 67, 379/211, 212, 213, 214, 233

[56] References Cited

U.S. PATENT DOCUMENTS

| | | | |
|---|---|---|---|
| 4,878,240 | 10/1989 | Lin et al. | 379/67 |
| 4,926,462 | 5/1990 | Ladd et al. | 379/67 |
| 4,980,906 | 12/1990 | Forson et al. | 379/32 |
| 5,012,511 | 4/1991 | Hanle et al. | 379/211 |
| 5,027,384 | 6/1991 | Morganstein | 379/67 |
| 5,029,196 | 7/1991 | Morganstein | 379/67 |
| 5,060,255 | 10/1991 | Brown | 379/67 |

*Primary Examiner*—Thomas W. Brown

[57] ABSTRACT

A centralized multiple service voice messaging system. Additional directory numbers are dedicated to the message service system. The central office switching processor is programmed to forward calls dialed to these dedicated directory numbers to the voice mail system. The voice mail system, in turn, is programmed to recognize these numbers and perform a service based on the directory number dialed by the calling party and, in some cases, the directory number of the calling party.

19 Claims, 5 Drawing Sheets

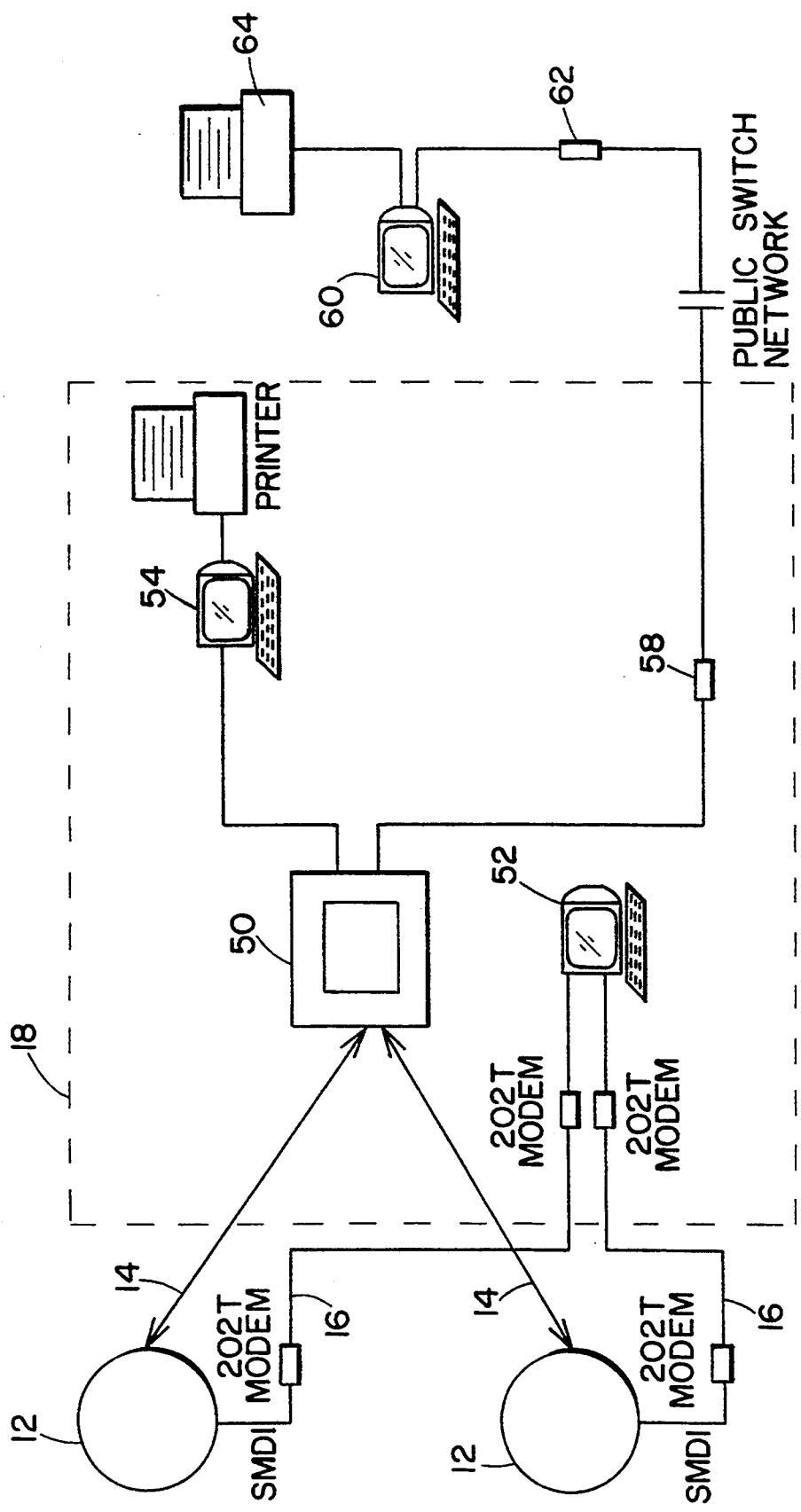

MULTIPLE SERVICE VOICE MESSAGING SYSTEM

This application is a continuation of application Ser. No. 07/989,725 filed Dec. 11, 1992, now abandoned, which was a continuation of application Ser. No. 07/599,693 filed Oct. 18, 1990, now abandoned.

BACKGROUND OF THE INVENTION

1. Field of the Invention

The present invention relates to telecommunication systems, and more particularly to a voice messaging system intended to provide comprehensive services that meet the needs of both residential and business clients.

2. Background Information

Various message storage systems are well known in the prior art. These systems can be categorized as distributed, such as a private answering machine, or centralized, such as an answering service.

Answering machines are attached to a telephone customer's line. There they intercept incoming calls, play a recorded message to the caller, record any message the caller may wish to leave, and then provide some type of indication that a message is waiting. On noticing the message waiting indication, the owner of the answering machine can play back the recorded message and save or erase it.

Centralized message storage systems consist of attended services such as answering bureaus and automated services such as voice mail systems. These are typically subscription services in which customers contract to have their telephone forwarded to and answered by the service after a set number of rings or when the telephone is busy. The caller hears a personalized greeting and can leave a message to be passed to the subscriber at a later time.

In a typical answering bureau, a group of lines is connected from the central office to the bureau. Clients of the answering service can designate the conditions under which incoming calls to their telephones are to be forwarded to that service. For example, clients may desire to forward their calls when their telephone is busy, forward their calls after a pre-selected number of rings, or always forward their calls. One or more attendants located at the bureau receives and handles calls forwarded from clients. When the client is on the telephone, or does not answer the telephone, the incoming calls are forwarded to the answer bureau where they are answered by an attendant. At the same time, the electronic switching system forwards call information to the attendant, typically over a leased RS232 data line obtained from the central office operating company. Call information typically includes the directory number of the telephone called, the reason for forwarding and, if the calling telephone is within the same central office network, the directory number of the calling party. The attendant can then extend a personal greeting incorporating the name of the person being called and record a message. The type and tone of greeting used by the attendant can be selected by the client to reflect the client's line of business or personality. As an option, many telephone systems allow the attendant to notify the client via an audible message waiting indicator signal (e.g. a stutter dial tone) that there is a message waiting. The messaging service attendant activates this indicator for each line through a message sent back to the central office on the leased RS232 line.

Centralized automated voice mail systems are an alternative to the answering bureau. An automated voice mail system typically is a record and playback system that, in its most basic form, plays a pre-recorded message customized to the called telephone number to the incoming caller and then, under dual-tone multifrequency DMTF dialing control, records a message intended for the person being called. Voice mail systems derive their name from another feature; they permit subscribers to send voice messages to one or more other subscribers. Since these systems evolved from attended answering bureaus, they have retained many of the characteristics of an answering bureau. Like the answering bureau, automated voice mail systems typically are connected through a group of local lines to the central office. They also are connected via a dedicated data line to the Input/Output Processor at the central office. Like the answering bureau, they receive notification of an incoming forwarded call, its directory number and the reason it is being forwarded. If the caller originates within the same central office network, they also receive the directory number of the calling party. In voice mail systems, calls forwarded are answered with a pre-recorded message that may be customized for each client number and the reason the call was forwarded. The incoming caller is given an opportunity to record a message for the client. Callers can listen to their message and record a different message if desired. They then post the message to the client's reserved message storage area, or mailbox, and terminate the call. The automated voice mail system then notifies the client by activating the message waiting indicator, if available, via the dedicated data link.

The method of retrieving messages is generally the same in both attended and automated centralized message storage systems. The caller dials the directory number for the service, provides an identification code and security code or password, and requests messages. The messages are then relayed to the client.

In more sophisticated automated voice messaging systems, the directory number of the caller's telephone is compared against a list of client directory numbers and, on a match to a number on the client list, the client is asked for a password. Upon reception of the correct password, the client is given access to messages in his mailbox.

Automated voice messaging machines offer some advantages over answering bureaus. The caller is always greeted in the same way and with the same personalized message. The cost of equipment is greater for a voice mail system but this cost can be amortized across a large client base and there are significant savings in operating expense since there is no requirement for attendant salaries.

Present automated voice messaging systems also offer some advantages over customer owned answering machines. Customers benefit in terms of lower expense from the amortization of capital equipment across the customer base. This means that superior equipment with advanced features is available at a cost comparable to that of private answering systems. In addition, the customer is provided with a low cost upgrade feature as more advanced equipment is added to the voice mail service.

In addition, new and better services are available to the customer. For example, a major advantage in centralized systems is the ability to forward a call when the customer's telephone is in use. Answering machines require access to the same telephone line being used by the customer. Therefore, a call to a telephone that is busy offers no alternative to the caller but to call back later. Important calls may not get through to the customer. That this is perceived as a problem is demonstrated in the popularity of the call waiting feature offered by many telephone networks. Call waiting operates by providing a pulsed set of tones to the customer's telephone. The customer can then toggle the switchhook and answer the incoming call. The customer can then toggle the switchhook again to get back to the original party. An answering system that forwards and answers incoming calls on detection of a busy line would be more desirable than the call waiting feature since there is no need to interrupt the call in progress. The caller will be notified that the telephone is busy and will be able to leave a message if desired.

There are, however, some disadvantages in using a centralized voice mail system in place of a private answering machine. Present centralized voice mail systems are perceived by some as cumbersome to use. The variety of options provided by a voice mail system requires a sizeable menu to traverse an array of questions that the customer must answer in order to get through and retrieve messages or change their greeting message. In contrast, private answering machines are perceived as simple to use. Message retrieval is simple: the user typically pushes one or two buttons to play back all messages. New greeting messages can be recorded easily.

A second disadvantage in present centralized voice mail systems is that as the client base of a voice mail system grows the processing time needed to retrieve client information (such as directory number or password) mushrooms. System response will appear to slow as the voice mail system juggles the tasks of screening clients asking for messages, providing of those messages, answering incoming calls and recording messages from those incoming forwarded calls. This may be frustrating for the client attempting to retrieve his messages.

There is a need in the art for a centralized automated voice mail system for use by business and residential customers. This system should be as easy to program and to retrieve messages as an answering machine but offer features that are not available or economical in answering machine systems. At the same time, there is a need for a system for segregating clients into manageable groups for the retrieval of messages on automated messaging systems. The desired system should be flexible enough to work with existing voice mail systems and to offer a client interface that can be modified to meet the needs of certain client groups.

SUMMARY OF THE INVENTION

The present invention is an improvement to installed voice mail systems that permits differentiation between incoming calls to provide a variety of services beyond the typical voice mail and message forwarding service.

In accordance with the invention, additional directory numbers are dedicated to the message service system. The central office switching processor is programmed to forward calls dialed to these dedicated directory numbers to the voice mail system. The voice mail system, in turn, is programmed to recognize these numbers and perform a service based on the directory number dialed by the calling party and, in some cases, the directory number of the calling party.

Message service systems constructed according to this invention provide a simpler customer interface for the retrieval of messages and the recording of new greeting messages. In addition, message service systems constructed according to this invention handle growth in their client base more easily than in previous message service systems.

In one embodiment, the additional directory numbers provide rapid access to messages for clients by placing them directly into their mailbox.

In another embodiment, the additional directory numbers provide a means to differentiate services to groups or classes of clients. The automated message system operator can gear specialized services to specific client groups, can monitor activity within client groups and adjust service implementation and marketing strategy accordingly.

In yet another embodiment, the additional directory numbers provide rapid access to message services such as time, weather, product announcements, or promotional events.

BRIEF DESCRIPTION OF THE DRAWINGS

FIG. 4 is a block diagram representation of a voice mail system.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
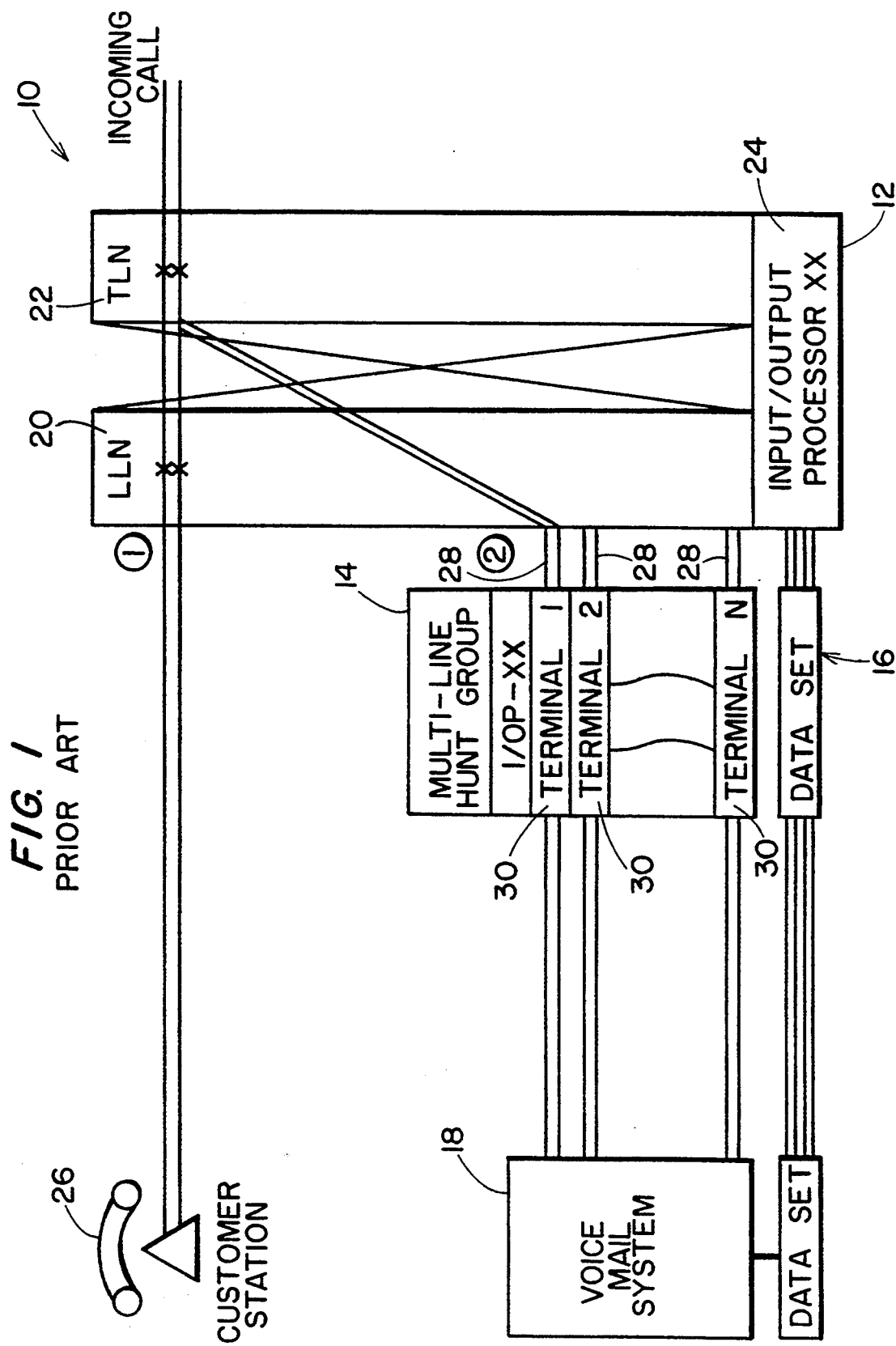
FIG. 1 is a block diagram representation of a voice messaging system of the prior art.

FIG. 1 shows a message service system 10 of the prior art. Central office 12 is connected to customer station 26 and, via multi-line hunt group (MLHG) 14 and I/O data link 16, to voice mail system 18. Central office 12 contains a local link network 20, a trunk link network 22, and an input/output (I/O) processor 24.

A central office operating company typically assigns a multi-line hunt group 14 and an I/O data link 16 to each voice mail system 18. Multi-line hunt group 14 is a group of local link lines 28 all having the same directory number. Each pair of lines 28 is connected through an independent terminal 30 to voice mail system 18. On receiving a call to be forwarded to voice mail system 18, I/O processor 24 searches for a non-busy terminal 30 and routes the call through that terminal to voice mail system 18. If all terminals are busy, the call goes onto a queue to be put through as a terminal becomes available.

Figure 2:
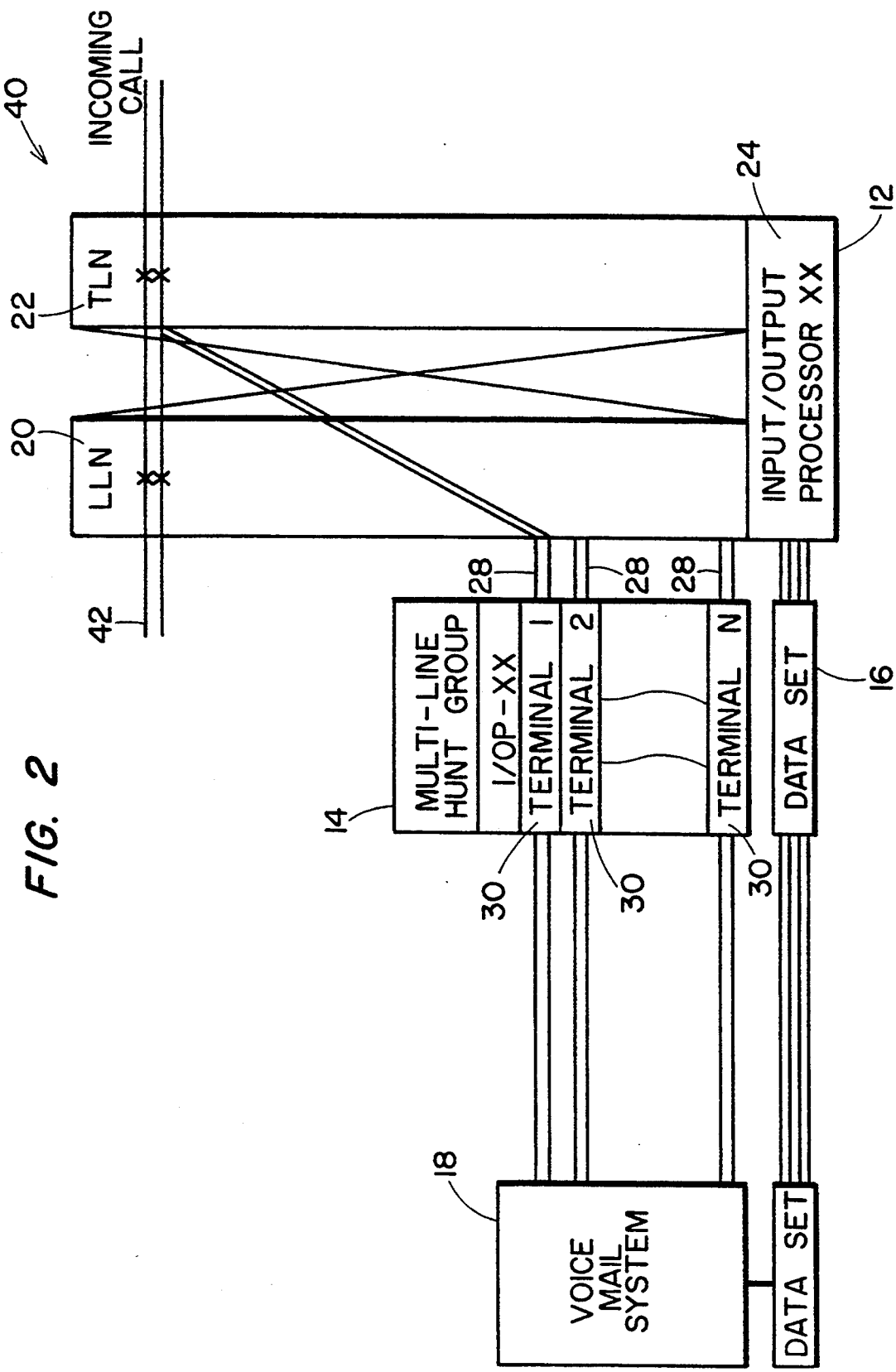
FIG. 2 is a block diagram representation of a multiple telephone directory line voice messaging system according to the present invention.

FIG. 2 illustrates an improved message service system 40 of the present invention which allows multiple telephone directory number access to voice mail system 18. Message service system 40 is similar to system 10 of FIG. 1 with the exception of the addition of dedicated lines 42 configured to always forward incoming calls to voice mail system 18. Forwarded calls bearing these directory numbers are recognized by voice mail system 18 and alternative services are provided accordingly.

FIG. 4 shows voice mail system 18 of FIGS. 1 and 2 in greater detail. Voice mail system 18 is a controlled by voice response unit 50. Voice response system 18 is connected to a multiple link unit 52, a terminal 54 and, via modems 58 and 62, to computer 60. Multiple link unit 52 allows voice mail system 18 to be connected to more than one central office 12 by multiplexing I/O data link 16 communication of each central office 12 so as to present a single link to voice response unit 50. Terminal 54 is used by the voice mail system administrator to monitor the system, maintain subscriber mailboxes and perform general system maintenance. Terminal 54 is connected to printer 56 for printing status or reports. Computer 60 provides remote access to voice mail system 18 to perform functions similar to terminal 54 from a remote site. Computer 60 is connected to printer 64 for printing status or reports.

Multi-line hunt group 14 and I/O data link 16 provide communication between central office 12 and voice mail system 18. More than one central office 12 can be connected to a single voice mail system 18. A multi-line hunt group 14 from each central office 12 carries voice calls to voice response unit 50. An I/O data link 16 from each central office 12 carries call information to, and message indicator activation messages from, multiple link unit 52.

When a call is forwarded to voice mail system 18, voice response unit 50 uses the subscriber's directory number (or some other unique identifier) as the key to find the subscriber's mailbox. Unit 50 then answers the call over MLHG 14 with the personal greeting associated with that subscriber's mailbox. If the caller leaves a message, the message is transmitted to unit 50 over MLHG 14, digitized, and stored in the subscriber's mailbox location on the unit 50 message drive.

Subscribers retrieve recorded messages by calling into voice mail system 18 through multi-line hunt group 14. Voice response unit 50 has programmable logic which either locates the appropriate subscriber mailbox through the call information transmitted with the subscriber's retrieval call or provides a set of prompts to guide the caller in keying in the appropriate mailbox identifier.

It should be noted that other methods of connecting a voice message system to a central office may be implemented without departing from the scope and spirit of the invention. For example, a Direct Inward Dial (DID) trunk group configured as wink start, seven digits, and DMTF could be used. The attachment of voice mail systems to a central office network is well known in the art and therefore will not be discussed in greater detail.

Voice mail systems are well known in the art. A representative voice mail system would be the OCTel Aspen MAXUM system manufactured by OCTel. Other messaging systems that could be used are disclosed in U.S. Pat. No. 4,221,933, issued to Cornell et al. on Sep. 9, 1980, in U.S. Pat. No. 4,580,012, issued to Matthews et al. on Apr. 1, 1986, in U.S. Pat. No. 4,625,081, issued to Lotito et al. on Nov. 25, 1986 and in U.S. Pat. No. 4,747,126, issued to Hood et al. on May 24, 1988, which patents are hereby incorporated by reference.

In the preferred embodiment, the electronic switching system within central office 12 is a 5ESS system manufactured by AT&T. I/O Processor 24 is an AT&T Applications Processor executing the Advanced Communications Package. Voice response unit 50 is an OCTel Aspen MAXUM voice mail system. Multiple link unit 52 is a preconfigured Hewlett-Packard Vectra personal computer.

In an alternate embodiment, the electronic switching system within central office 12 is a 1A ESS switch manufactured by AT&T. In this case, channel data link 16 is replaced with a I/O channel. leased from the operating company. An I/O channel carries the call data from central office 12 to voice mail system 18. An I/O channel is a standard Electronic Industries Association (EIA) RS232 asynchronous 1200-baud ASCII channel used to transmit call information to voice mail system 18 and message waiting indicator messages back from voice mail system 18 to the central office 12. This configuration requires a change in the multiple link unit 52 interface.

Dedicated lines 42 could be formed by programming I/O processor 24 to forward all calls placed to the directory numbers associated with lines 42 to multi-line hunt group 14. Or dedicated lines 42 could be formed by configuring lines 42 to always appear busy and then using the "call forward when busy" feature of a voice messaging system to reroute the call to multi-line hunt group 14. In the preferred embodiment, the permanently busy line approach was the fastest. I/O processor 24 must wait one ring before forwarding a call to a permanently forwarded dedicated directory number. The detection and forwarding of calls to busy telephones or to telephone lines configured to always appear busy happens quickly.

In the preferred embodiment, a majority of the lines included in the message service system belong to that class of service that provides answering services to client lines. Dedicated lines 42 are devoted to new or expanded services such as rapid message retrieval, time, weather or advertising bulletins promoting special events like special sales or concerts.

Figure 3A:
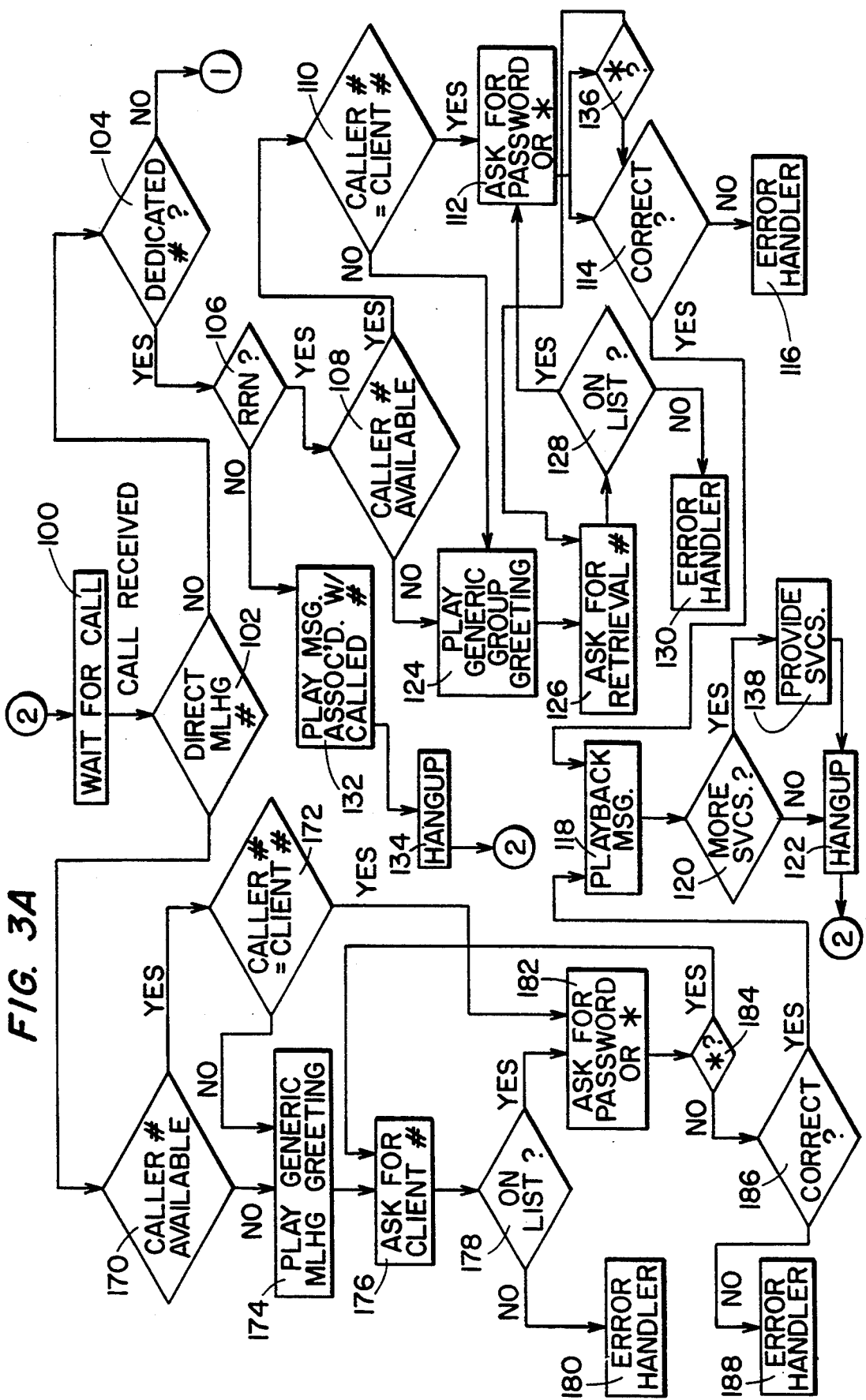
FIGS. 3A and 3B are flow chart representations of the sequence of steps executed by the programmable logic within the voice mail system on receiving of a call.
Figure 3B:
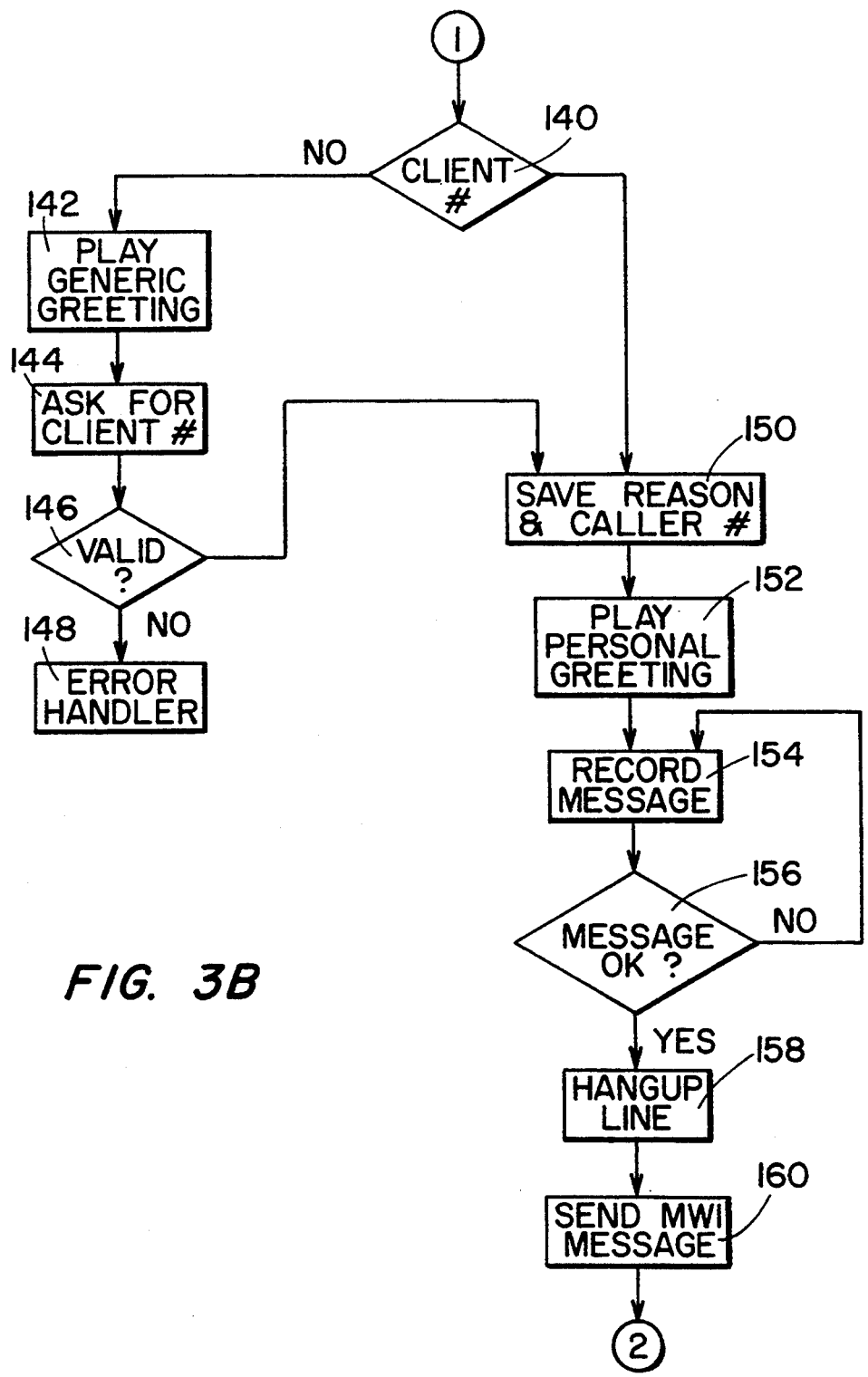

FIGS. 3a and 3b describe a representative control flow program for programmable logic within voice mail system 18. This control flow assumes the caller is using a DMTF (touch-tone) telephone. The routine is entered at 100 where voice mail system 18 waits for notification of an incoming call. Notification of an incoming call and the call information associated with that call is sent by I/O processor 24 over I/O data link 16. On receiving notification of an incoming call, a check is made at 102 to see if the multi-line hunt group was dialed directly by the incoming call. If not, a check is made at 104 to see if the number dialed was the directory number of one of the dedicated lines 42.

If the check at 104 determines the number dialed was the directory number of one of the dedicated lines 42, a check is made at 106 to see if the number dialed was a rapid retrieval number. If not, the called number must be one of the special services such as time or advertising promotion and at 132 the message associated with the called number is played to the caller. The connection is broken at 134 and control returns to 100.

If the check at 106 determines that the number called was a rapid retrieval number, a check is made at 108 to see if the call information associated with the call carried the caller number (i.e. originated from within the same central office). If the caller number is available, a check is made at 110 to see if the caller number matches a number on the list of client numbers associated with the rapid retrieval group. If the caller number matches a number on the client list, the voice mail system 18 assumes that the caller is that client. Voice mail system 18 at 112 asks the caller to enter a password on his telephone. At this point the client can either press the # (octothorpe) key followed by the password or the * (star) key. Pressing the star key informs voice mail system 18 that the client number provided is not the directory number of the mailbox from which the caller wishes to retrieve messages. A check is made at 136 to see if the star key has been entered. If so, control moves to 126 and the caller is asked to press the octothorpe key followed by the directory number of the client whose message he wishes to retrieve. If not, a check is made at 114 to see if the password matches the password associated with the client. If not, voice mail system enters error handler 116. If the password does match the client's password, control moves to 118 where the accumulated messages within the client's mailbox are played back to the caller and then to 120 where the caller is asked if he desires more services. If additional services are required (change personal greeting message, erase or save messages) the voice mail system provides them at 138. If no more services are required, control moves to 122, the connection to the caller is broken and control returns to 100.

If the check at 108 determines that the caller directory number is not available (e.g. the call was placed from outside the central office network) or the check at 110 determines that the provided caller number does not match a number on the list of client directory numbers, a generic greeting specific to the client group is played to the caller at 124 and at 126 the caller is asked to press the # (octothorpe) key followed by the directory number of the client whose message he wishes to retrieve. A check is made at 128 to determine if the number entered matches a number on the list of client numbers associated with the rapid retrieval group. If the entered retrieval number matches a number on the client list, control moves to 112 to ask for the client password. If the entered number does not match a client number, voice mail system 18 enters error handler 130.

If the check at 104 determines the number dialed was not the directory number of one of the dedicated lines 42, a check is made at 140 to see if the number dialed was a valid client directory number. If not, a generic customer handling greeting is played to the caller at 142 and at 144 the caller is asked to press the octothorpe key followed by the directory number of the client to whom he wishes to leave a message. A check is made at 146 to determine if the number entered matches a number on the overall list of client numbers. If the entered number does not match a client number, voice mail system 18 enters error handler 148.

If the entered retrieval number matches a number on the client list at 146 or the called number matches the client list at 140, the incoming call information is saved at 150 and the personal greeting associated with the client number and the reason for forwarding is played to the caller at 152. The caller is then asked at 154 if he wishes to leave a message. The caller can then listen to the message at 156 and determine if he would like to record a different message. If so, control moves back to 154. If not, control moves to 158 and the connection is broken. At 160 voice mail system 18 sends a message waiting indicator activation message to the central office for the number called and control returns to 100.

If the check made at 102 determines that the multi-line hunt group was dialed directly by the incoming call, a check is made at 170 to determine if a caller number is available. If not, a generic multi-line hunt group message is played at 174 and at 176 the caller is asked to press the # key followed by the directory number of the client whose message he wishes to retrieve. A check is made at 178 to determine if the number entered matches a number on the overall list of client numbers. If the entered retrieval number matches a number on the client list, control moves to 182 to ask for the client password. If the entered number does not match a client number, voice mail system 18 enters error handler 180.

If the caller number matches a number on the client list at 172 or the entered number matches a number on the client list at 178, the caller is asked at 182 to provide a password or press the * key. A check is made at 184 to see if the * key has been pressed. If so, control moves to 176 and the caller is asked to press the # key followed by the directory number of the client whose message he wishes to retrieve. If not, a check is made at 186 to see if the password matches the password associated with the client. If not, voice mail system enters error handler 188. If the password does match the client's password, control moves into the normal retrieval routine at 118.

Rapid message retrieval with a special customer interface is a service made possible through the use of the additional dedicated lines 42. Prior to this service, clients called into the directory number of the multi-line hunt group. There, a generic message retrieval greeting asked them for the number associated with their mailbox. The caller then had to enter the mailbox number and wait for voice mail system 18 to ask for a password. In a system according to the current invention, clients can dial directly to their assigned dedicated directory number. Their call is automatically forwarded to the multi-line hunt group. Now, however, the call is accompanied by the directory number of the appropriate dedicated line 42 (the called number) and the directory number of the caller's line. The directory number of the called line is used to select a list of valid clients associated with this number and the method to be used in linking them to their mailboxes.

For residential customers, the list contains the client's telephone directory number and a password and mailbox number associated with that client. The list is searched for the directory number of the caller's line. If there is a match, the mailbox number is obtained and the caller is asked for a password. If the correct password is entered, the caller is given access to the client's messages. Therefore, there is only a single data entry point between the dialing of the message service and the retrieving of stored messages.

For businesses, the list contains a mailbox number and password associated with each client. On dialing a business client group dedicated directory number, the caller is asked for his mailbox number and then his password. If the correct password is given, the caller is given access to the client's messages.

As can be seen, a system constructed according to this invention provides an opportunity to mold answering services to the clients' needs. The residential service interface trades a simpler message retrieval interface on calls originating from the client's home against a more cumbersome interface on calls into the service from other telephones. The business service trades a slightly more cumbersome approach to retrieving messages for the ease of facing the same interface no matter which telephone originates the retrieval call.

Although the residential interface and the business customer interface have been described here in reference to the preferred embodiments, those skilled in the art will recognize that other interfaces could be designed without departing from the scope and spirit of the invention.

To use the present invention, a subscriber goes offhook and hears a stuttering dial tone from central office 12 informing him that a message is waiting. The customer then dials the directory number of one of the dedicated lines 42. Central office 12, on attempting to connect the subscriber's telephone to dedicated line 42, determines the line is busy and looks for an open terminal in the multi-line hunt group. If a terminal is open, central office 12 connects the incoming call terminal 30 and notifies voice mail system 18 that a call has been forwarded, the reason forwarded (e.g. busy), the directory number of the dedicated line and the directory number of the calling party. Voice mail system 18 compares the called number to a list of possible numbers, determines the type of service and executes a program to provide that service.

Although the present invention has been described with reference to the preferred embodiments, those skilled in the art will recognize that changes may be made in form and detail without departing from the spirit and scope of the invention.

What we claim is:

1. An interface to access a plurality of types of service in a voice messaging system, said interface comprising:
   at least one dedicated telephone line devoted to each of said types of service, each said dedicated telephone line identified by a dedicated directory number and operatively associated with said voice messaging system;
   means operatively associated with said voice messaging system, for forwarding to said voice messaging system a call made from a calling telephone line to one of said dedicated telephone lines; and
   means, operatively associated with said voice messaging system for recognizing said dedicated directory numbers.

2. An Interface according to claim 1 further including means, operatively associated with said voice messaging system, for identifying said calling telephone line.

3. An interface according to claim 2 wherein said identifying means includes:
   an input/output processor, and
   a simplified message desk interface operatively associated with said input/output processor.

4. An interface according to claim 1 wherein said recognizing means includes:
   a multiline hunt group operatively associated with said voice messaging system;
   an input/output processor operatively associated with said voice messaging system;
   a plurality of terminals operatively associated with said voice messaging system; and
   a matching look-up table associated with said voice messaging system.

5. An interface according to claim 2 wherein the aforesaid types of service include rapid message retrieval.

6. An interface according to claim 1 wherein said types of service include business voice messaging.

7. An interface according to claim 1 wherein said types of service include residential voice messaging.

8. An interface according to claim 1 wherein said types of service include advertising bulletins.

9. An interface according to claim 1 wherein said types of service include time service.

10. An interface according to claim 1 wherein said types of service include weather service.

11. An interface according to claim 1 wherein said dedicated telephone lines are configured to always appear busy.

12. An interface according to claim 1 wherein said forwarding means includes an input/output processor programmed to forward to a multiline hunt group all calls placed to said dedicated telephone lines.

13. A method for providing a plurality of types of services in a voice messaging system comprising the steps of:
   devoting at least one dedicated telephone line to each of said types of services;
   forwarding to said voice messaging system calls made from a calling telephone line to one of said dedicated telephone lines;
   identifying said one of said dedicated telephone lines to said voice messaging system; and
   providing a service to said calling telephone line dependent upon the results of said step of identifying.

14. A method according to claim 13 further including the steps of:
   providing a number associated with said calling telephone line to said voice messaging system; and
   comparing said number to a matching look up table.

15. A method according to claim 14 wherein the aforesaid step of providing a service includes providing rapid message retrieval.

16. A method according to claim 13 further including, prior to said step of forwarding, the step of programming an input/output processor to forward call information for calls placed to said dedicated telephone lines to a multiline hunt group.

17. A method according to claim 13 further including, prior to said step of forwarding, the step of configuring said dedicated telephone lines to always appear busy.

18. In a telephone network including:
   a plurality of access lines;
   a multiline hunt group operatively associated with said telephone network;
   an input/output processor operatively associated with said telephone network;
   a simplified message desk interface operatively associated with said input/output processor; and
   a voice mail system operatively associated with said simplified standard message desk interface and said multiline hunt group for providing a plurality of types of voice messaging services, the improvement comprising:
   a plurality of dedicated lines each identified by a dedicated directory number, each of said dedicated lines associated with a particular one of said types of voice messaging services and operatively associated with said telephone network;
   wherein said input/output processor is programmed to forward to said multiline hunt group calls made from said access lines to said dedicated directory numbers.

19. A telephone network according to claim 18 wherein said dedicated lines are configured to always appear busy.

* * * * *

UNITED STATES PATENT AND TRADEMARK OFFICE
CERTIFICATE OF CORRECTION

PATENT NO. : 5,450,488
DATED : Sep. 12, 1995
INVENTOR(S) : John B. Pugaczewski, Mark S. Maize It is certified that error appears in the above-indentified patent and that said Letters Patent is hereby corrected as shown below:

On title page,
    insert: [73] Assignee:   U S WEST Advanced Technologies, Inc., Boulder, Colo.

insert:  Attorney, Agent, or Firm--Timothy R. Schulte

Signed and Sealed this

Twenty-eighth Day of May, 1996

Attest:

BRUCE LEHMAN

*Attesting Officer*    *Commissioner of Patents and Trademarks*